United States Patent Office 2,990,422
Patented June 27, 1961

2,990,422
PROCESS FOR PREPARING CITRONELLOL FROM AN ACYCLIC TERPENE
Eugene L. Woroch, Itasca, and J. Wayne Cole, Oak Park, Ill., assignors to The Glidden Company, Cleveland, Ohio, a corporation of Ohio
No Drawing. Filed Dec. 9, 1957, Ser. No. 701,371
10 Claims. (Cl. 260—462)

This invention relates to a novel process for the preparation of citronellol. The invention is more specifically directed to a process for preparing citronellol readily and inexpensively by the employment of an acyclic diene of the terpene series, namely, 2,6-dimethyl-2,7-octadiene as the starting material.

In the past decade or so certain boron compounds have been found to be good catalysts and good reducing agents for reducible groups. These boron compounds, of which lithium or sodium borohydride (Li or $NaBH_4$) are exemplary, have been employed for the reduction of such functional groups, as carbonyl e.g. ketones and aldehydes, esters and the like to their corresponding primary or secondary alcohols. Boron, itself, is known to form a compound, diborane ($B_2H_6$) which has heretofore been found to react with mono-olefins, with saturation of the double bond and the formation of a trialkyl boron.

The reaction of diborane with polyene compounds, either acyclic or cyclic, has not heretofore been reported to the best of our knowledge. All of the prior art relating to the reaction of alkene hydrocarbons with diborane has been limited to the treatment of mono-unsaturated olefinic materials, preponderantly those of not more than about six carbon atoms to obtain saturated trialkyl boron compounds. As will be brought out hereinafter, our invention relates to a process for preparing citronellol, an unsaturated acyclic alcohol of the terpene series, from an acyclic diene 2,6-dimethyl-2,7-octadiene.

Citronellol, a $C_{10}$ terpene alcohol, 2,6-dimethyl-2-octen-8-ol, also known as 3,7-dimethyl-6-octenol, is a valuable terpene alcohol per se and also as an intermediate in the manufacture of 1-menthol. It is an oily liquid with an odor of rose for which the following physical characteristics have been reported:

$d^{15}$ 0.850–0.857, b. 220° C., $n_d^{20}$ 1.4566

Citronellol is very slightly soluble in water and miscible with alcohol and ether. Methods of preparing citronellol include by the action of sodium amalgam on the aldehyde citronellal and from the various volatile oils, e.g. geranium, rose, etc. These processes are, however, expensive and in view of the value of citronellol it would be highly desirable to obtain it by a cheaper process from readily available raw materials.

In accordance with the foregoing an object of our invention is the preparation of citronellol from a readily available raw material.

A further object of our invention is the provision of a process for the conversion of 2,6-dimethyl-2,7-octadiene to citronellol.

A still further object of our invention is the provision of novel intermediates suitable for conversion to citronellol.

Other objects will be apparent from a description of our invention which follows.

In accordance with the foregoing, we have found that we can convert 2,6-dimethyl-2,7-octadiene to citronellol by a process which comprises contacting said 2,6-dimethyl-2,7-octadiene with diborane, oxidizing the resulting trialkenyl boron and hydrolyzing in an aqueous medium.

In essence, our invention is predicated upon the fact that an acyclic diene, 2,6-dimethyl-2,7-octadiene, can be treated with diborane to yield, a trialkenyl boron compound and the trialkenyl boron then oxidized and hydrolyzed to produce the desired alcohol. The results obtained by the process of our invention were unexpected.

In the preferred embodiment of our invention, we contact 2,6-dimethyl-2,7-octadiene with diborane, (a colorless gas at room temperature) the contact being made in a suitable solvent for the reactants and in an inert atmosphere at room or slightly above room temperature to obtain tricitronellyl boron and thereafter oxidize and hydrolyze the compound and recover the desired citronellol. The diborane can be generated in situ or introduced as a gas into the reaction system.

As indicated, diborane can be employed as a gas obtained outside of the system or it can be generated in the system in situ in a suitable solvent by the treatment of a boron compound with a reagent capable of generating it. The $B_2H_6$ gaseous compound is stable, is available commercially, and can also be obtained by the following methods:

(1) The treatment of sodium borohydride with boron trifluoride etherate.
(2) The treatment of lithium borohydride with boron trifluoride etherate.
(3) The treatment of sodium trimethoxyborohydride with boron trifluoride etherate, and
(4) The treatment of lithium hydride with boron trifluoride etherate.

For a description of these methods of generating diborane, see J.A.C.S. 75, 187 1953.

We have employed sodium hydride in the presence of boron trifluoride etherate in a solvent to yield the desired diborane compound. We can also employ anhydrous aluminum chloride and sodium borohydride to yield the diborane compound. It can thus be seen that methods of preparing diborane are known and we do not intend to limit our invention to any of the specific methods disclosed.

The other reactant component of the process of our invention, 2,6-dimethyl-2,7-octadiene, can be obtained readily from turpentine. Essentially, starting with the abundant material turpentine, there can be obtained α pinene which, upon hydrogenation with, for example, a Raney nickel catalyst, will yield pinane. Pinane can thereafter be pyrolyzed in the presence of a mildly acidic catalyst, desirably on the surface of an absorbent such as pumice, at temperatures of from 400 to 700° C. to yield a mixture comprising 2,6-dimethyl-2,7-octadiene which can be recovered therefrom by fractional distillation. We have obtained a fraction having the following properties: $d_4^{25}$ 0.7583, $N_d^{25}$ 1.4363, $[\alpha]_D^{25}$ —7.91 and B. 94.5/100 mm. Any known method for obtaining 2,6-dimethyl-2,7-octadiene can be employed, however. It should be pointed out that we prefer to start with a diene produced from an optically active pinane from β-pinene obtained from American turpentine using a nickel catalyst to obtain an optically active citronellol. The citronellol can be dehydrogenated to optically active citronellal, a precursor of optically active 1-menthol using the well known process involving cyclization of citronellal to isopulegol then hydrogenating the latter to menthol. From what has been stated above it will be recognized that we provide a process for producing an expensive and valuable p-menthane alcohol possessing organoleptic properties by a relatively simple procedure by employing cheap readily available raw materials.

We have prepared and isolated tricitronellyl boron, an intermediate (and new compound) in the process of our invention as will be illustrated in the specific examples.

The oxidation of the tricitronellyl boron can be accomplished with known oxidizing agents such as hydrogen peroxide, oxygen, nitric acid, alkaline potassium permanganate, etc. We presently prefer to employ hydrogen peroxide in an aqueous alkaline medium, for example, an alkali metal hydroxide solution. By this procedure, the oxidation and hydrolysis of the trialkenyl boron is satisfactorily accomplished. In regard to hydrolysis, the intermediate trialkenyl borate can also be hydrolyzed by treatment with water or dilute acids.

In that embodiment of our invention wherein we generate diborane in situ we employ a solvent for the reactants as a means for facilitating the preparation. Thus, where diborane is generated from sodium hydride and boron trifluoride etherate or from anhydrous aluminum chloride and sodium borohydride, we employ diethylene glycol dimethyl ether (diglyme) as a solvent. Other solvents that are applicable are dioxane, tetrahydrofuran, etc. The preparation of the boron trifluoride etherate is described by Schlesinger et al. in J.A.C.S. 75, 195 (1953) and essentially consists of passing $BF_3$ gas into anhydrous ethyl ether until the liquid is saturated. The etherate is then obtained by distillation and recovery of the fraction desired.

Although we can carry out the reaction of diborane and 2,6-dimethyl-2,7-octadiene at temperatures between about 0° C. and 160° C., we prefer to employ room temperature or slightly above room temperature. The resulting tricitronellyl boron can thereafter be oxidized and hydrolyzed by refluxing in a suitable vessel as will be shown in our specific examples.

Although the illustrative examples below describe in detail the reaction conditions, it should be understood that various modifications can be made therein by the employment of equivalents and the like.

Our invention resides essentially in the following overall reaction:

The following are examples.

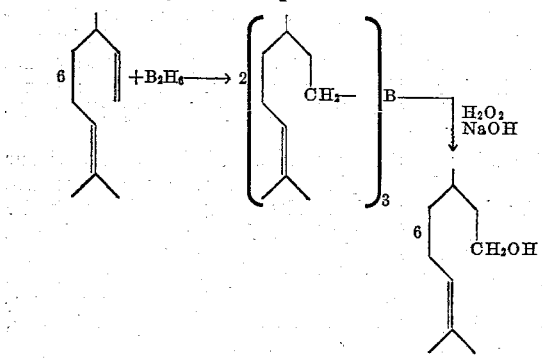

Example 1

To a 250 cc. volumetric flask was added 100 cc. of diglyme (dried by distillation from calcium hydride). The system was cooled in an ice bath and treated with 11.08 gms. (.084 mole) of anhydrous aluminum chloride and 9.45 gms. (0.25 mole) of sodium borohydride. The suspension was diluted to mark and stirred overnight at room temperature. After settling for one hour, 180 cc. of the supernatant liquid was transferred to a dropping funnel by means of a pipette. This solution was added dropwise to 69 gms. (0.5 mole) of 2,6-dimethyl-2,7-octadiene in a flame dried 3-necked flask equipped with condenser, dropping funnel, stirrer and gas inlet tube. The system was flushed with dry nitrogen prior to introduction of reagents. After final addition of the diborane solution, the solution was stirred overnight and then heated to 100° for 1 hour. The mixture was treated with dilute acid, water and extracted with ether. The ether was dried, concentrated and the residue treated with 8.0 gms. of sodium hydroxide pellets, 100 cc. ethanol and 68 gms. of 27.5% hydrogen peroxide. After stirring and refluxing for one hour, the mixture was diluted with water and ether extracted. After water washing and drying, the ethereal solution was concentrated and the residue steam distilled, giving 41.3 gms. of volatile material. The infrared pattern of this material showed that it was principally citronellol.

Example 2

Sixty-nine gms. (0.5 mole) of 2,6-dimethyl-2,7-octadiene was added to a stirred solution of 9.5 gms. (0.25 mole) of sodium borohydride and 11.2 gms. (0.084 mole) of anhydrous aluminum chloride in 250 cc. of dry diglyme under a nitrogen atmosphere. The reaction was carried out as described in Example 1.

The trialkenyl borane was separated by extraction and concentrated. After oxidation and hydrolysis with alkaline hydrogen peroxide the total product (61.5 gms.) was separated by distillation giving the following results by infrared pattern:

6.5% unknown fraction possessing strong hydroxyl and carbonyl absorption.
42% citronellol.
30% unknown fraction.
16% viscous residue.

Example 3

The reaction of Example 2 was repeated but this time employing 69 gms. of 2,6-dimethyl-2,7-octadiene, 6.27 gms. of sodium borohydride, 7.38 gms. of aluminum chloride. The results were substantially similar to those obtained in Example 2.

Example 4

A flame-dried three-necked flask was equipped with a stirrer, dropping funnel, gas inlet tube and gas exit tube. The gas exit tube was connected to a gas absorption bottle containing 41.4 gms. of 2,6-dimethyl-2,7-octadiene and 100 ml. of diglyme. The three-necked flask was charged with 22.8 gms. of boron trifluoride etherate and the whole system was flushed with dry nitrogen. To the stirred boron trifluoride etherate was added, over a period of two hours, 3.8 gms. of sodium borohydride in 100 ml. of diglyme. A slight exothermic reaction was observed. The liberated diborane was passed into the gas absorption bottle containing the diene. This absorption bottle was placed in a water bath and maintained at room temperature. After allowing to stand overnight (nitrogen atmosphere) the contents of the absorption bottle were treated with 100 cc. of ethanol and 6.0 gms. of sodium hydroxide pellets. Oxidation and hydrolysis were completed by the slow addition of 60 ml. of 27.5% hydrogen peroxide. After working up by extraction and concentration there was obtained 33.64 gms. of material shown by infrared and vapor phase chromatographic analysis to be largely citronellol.

Example 5

Reactions were carried out in which the sodium borohydride and the aluminum chloride in diglyme were replaced with sodium hydride and boron trifluoride etherate in diglyme. In a typical reaction 69 gms. (0.5 mole) of 2,6-dimethyl-2,7-octadiene was added to a suspension of 32 gms. of boron trifluoride etherate (0.225 mole) and 14.4 gms. (0.20 mole) sodium hydride in 100 cc. of diglyme. The system was refluxed under nitrogen for 72 hours and volatiles removed by stripping under vacuum. In this fashion 39 gms. of starting diene was recovered. The nonvolatile residue was worked up and subsequently oxidized with hydrogen peroxide in sodium hydroxide. This operation yielded 23 gms. of product having an infrared pattern practically identical with citronellol. On distillation, this fraction gave about 15 grams of citronellol plus higher boiling residues.

Example 6

A dry flask was charged with 9.45 gms. (0.25 mole) of sodium borohydride, 138 gms. (1.0 mole) of 2,6-dimethyl-2,7-octadiene and 100 cc. of diglyme. This and all succeeding operations were carried out in an atmosphere of dry nitrogen. The stirred mixture was treated with 47.5 gms. (0.33 mole) of borontrifluorideetherate over a period of two hours. After stirring for six hours the mixture was allowed to stand overnight. The solution was filtered to remove inorganic salts and the filtrate diluted with benzene. After washing with oxygen-free water and drying, the benzene solution was concentrated in vacuo. The residue was distilled in a Claisen flask at reduced pressures yielding a water-white liquid product having a boiling point of 141 to 145° C. at about two to three mm. pressure. The product fumed on a watch glass when exposed to the atmosphere and caused filter paper to char under similar conditions.

As indicated in the foregoing examples, the yields of citronellol can be readily ascertained by infrared analysis. Other physical or chemical means, however, will be apparent to the skilled chemist.

The citronellol prepared by the reactions described can be recovered by steam distillation of the washed solution as indicated or by extraction of the hydrolysis mixture with ether or petroleum ether followed by washing, drying and removal of the extraction solvent by distillation.

Although our invention has been described with reference to the production of citronellol, it is believed that the intermediate boron compounds formed, tricitronellyl boron and its oxidized counterparts, are new. As noted, however, we need not separate or recover the intermediate(s), and oxidation and hydrolysis can be performed on the tricitronellyl boron solution as shown.

Resort can be had to modifications and equivalents falling within the scope of our invention and the appended claims.

Having thus described our invention, we claim:

1. A process for preparing citronellol which comprises reacting 2,6-dimethyl-2,7-octadiene with diborane to form tricitronellyl boron and oxidizing said tricitronellyl boron and hydrolyzing the resulting oxidation product.

2. A process according to claim 1 wherein the diborane is generated in situ in the reaction system.

3. A process for preparing citronellol which comprises reacting 2,6-dimethyl-2,7-octadiene with the compound diborane to form tricitronellyl boron said reaction being carried out in an inert solvent for the reactants at a temperature of from about 0° to about 160° C. and oxidizing said tricitronellyl boron and hydrolyzing the resulting oxidation product.

4. A process for preparing citronellol which comprises reacting 2,6-dimethyl-2,7-octadiene with diborane to form tricitronellyl boron said reaction being carried out in an inert solvent for the reactants at a temperature in the range of from about 0° to about 160° C. oxidizing said tricitronellyl boron and hydrolyzing the resulting oxidation product in the presence of an alkali metal hydroxide solution and thereafter recovering said citronellol.

5. A process according to claim 4 wherein diborane gas is passed into the 2,6-dimethyl-2,7-octadiene.

6. A process according to claim 4 wherein the solvent for the reactants is diethylene glycol dimethylether.

7. A process according to claim 4 wherein the diborane is generated in situ in the reaction system.

8. A process which comprises reacting 2,6-dimethyl-2,7-octadiene with diborane to form tricitronellyl boron oxidizing said tricitronellyl boron and hydrolyzing the resulting oxidation product in the presence of an alkali metal hydroxide solution and recovering from said hydrolysis reaction, citronellol.

9. A method for preparing tricitronellyl boron which comprises reacting 2,6-dimethyl-2,7-octadiene with diborane.

10. A method for preparing tricitronellyl borate which comprises reacting 2,6-dimethyl-2,7-octadiene with diborane to form tricitronellyl boron and oxidizing said tricitronellyl boron.

References Cited in the file of this patent

UNITED STATES PATENTS

| | | |
|---|---|---|
| 2,036,593 | Mauersberger | Apr. 7, 1936 |
| 2,862,952 | Grozos | Dec. 2, 1958 |

OTHER REFERENCES

Hurd: J. Am. Chem. Soc., vol 70, pp. 2053–5 (1948).

Wertheim: "Textbook of Organic Chemistry," 3rd ed., McGraw-Hill, New York, 1951, pp. 166 and 695.

Parsons et al.: J. Am. Chem. Soc., vol. 76, p. 1710 (1954).

Lappert: Chem. Reviews, vol 56, pp. 1030–1 (1956).